United States Patent [19]

Kataumi et al.

[11] Patent Number: 5,421,792
[45] Date of Patent: Jun. 6, 1995

[54] SHIFT LEVER APPARATUS

[75] Inventors: Yoshimasa Kataumi; Yoshihiro Takikawa, both of Shizuoka, Japan

[73] Assignee: Fujikiko Kabushiki Kaisha, Japan

[21] Appl. No.: 201,163

[22] Filed: Feb. 23, 1994

[30] Foreign Application Priority Data

Feb. 26, 1993 [JP] Japan ............................ 5-037942
Apr. 28, 1993 [JP] Japan ............................ 5-102106

[51] Int. Cl.6 ............................................ F16H 41/06
[52] U.S. Cl. ...................................... 477/99; 74/477
[58] Field of Search ................. 477/99; 714/475, 477

[56] References Cited

U.S. PATENT DOCUMENTS

| 5,197,356 | 3/1993 | Kobayashi et al. | 477/99 |
| 5,251,723 | 10/1993 | Rolinski et al. | 192/4 A |
| 5,379,871 | 1/1995 | Asano et al. | 192/4 A |

FOREIGN PATENT DOCUMENTS 60-135352 7/1985 Japan .

OTHER PUBLICATIONS

U.S. patent application Ser. No. 08/097,287, filed Jul. 26, 1993, for Shift Lever Apparatus now Pat. No. 5,379,871.

*Primary Examiner*—Dirk Wright
*Attorney, Agent, or Firm*—Klarquist Sparkman Campbell Leigh & Whinston

[57] ABSTRACT

A shift lever apparatus for an automatic transmission includes first and second levers, which are pivotally supported on the positioning plate by a shaft, and a lock lever, which is pivotally supported by a shaft parallel to the shaft of the second lever. The apparatus also includes a spring for energizing the first and second levers so as to draw the arms of the first and second levers close together and to restrain the positioning pin positioned at the parking position. Even though an actuator is connected to and actuates the lock lever so as to rotate it in predetermined directions, since the lock lever of the arm is pressed by the first lever when the positioning pin is positioned at the parking position, the lock lever can be stabilized under The positioning pin to lock it at the parking position.

6 Claims, 18 Drawing Sheets

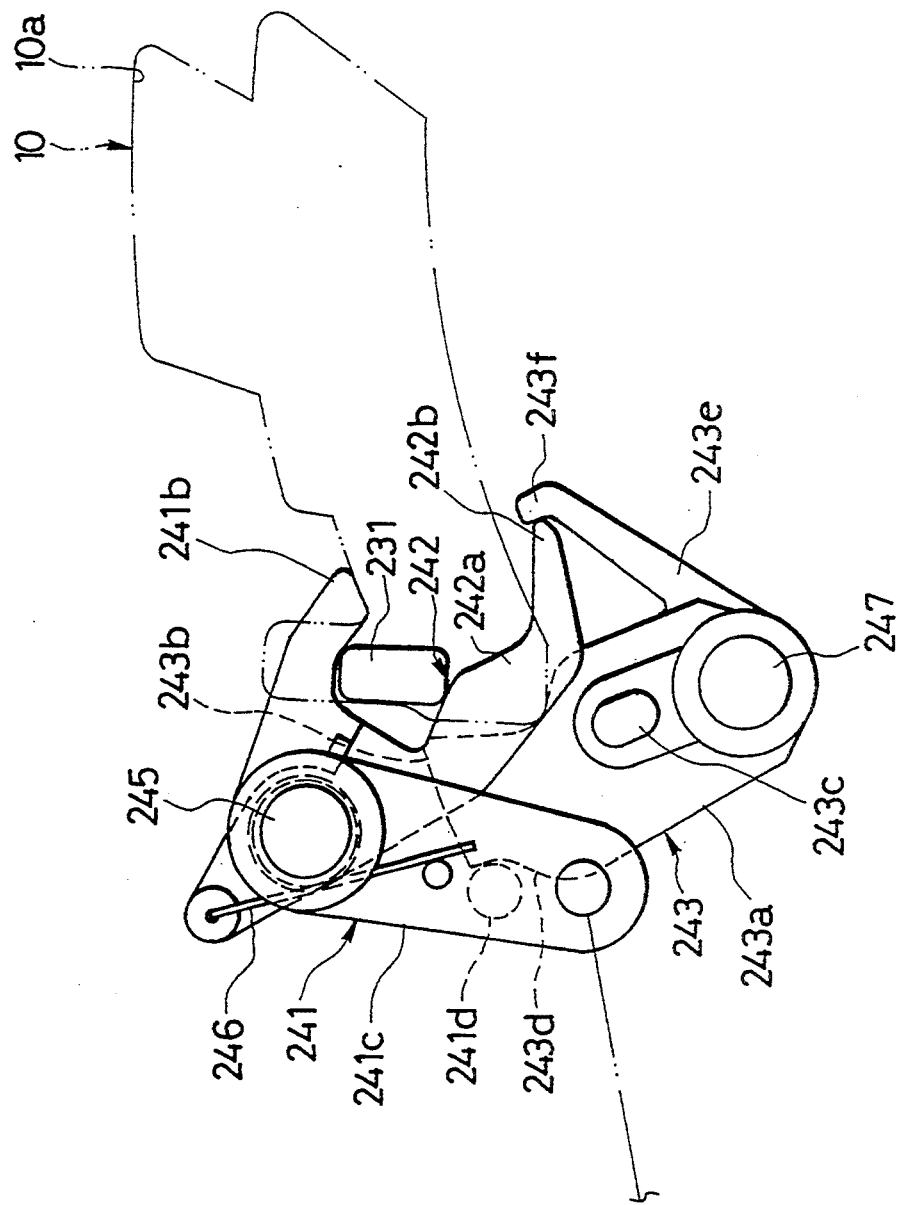

SHIFT LEVER APPARATUS

BACKGROUND OF THE INVENTION

The present invention relates to a shift lever apparatus, and more particularly, to a shift lever apparatus which is provided in a vehicle with an automatic transmission and which includes a locking mechanism for the shift lever and a key-interlock mechanism which operates in conjunction with the locking mechanism.

A shift lever apparatus has been disclosed in the Japanese Patent Application Laid Open No. 60-135352. In this shift lever apparatus, as shown in FIG. 1, a base portion 1a of a shift lever 1 is pivotally supported on a machine casing 7 and a positioning pin 2 is arranged on the shift lever 1 so as to freely move upwards and downwards. The positioning pin 2 is energized upwards by energizing means (not shown) at all times and can be moved downwards when a knob button (not shown) provided on the upper part of the shift lever 1 is pressed. A bell-crank 4 with an engaging slot 4a is pivotally supported on a positioning plate 3 and is energized by a spring 8 at all times so as to rotate clockwise. The engaging slot 4a of the bell-crank 4 engages with the positioning pin 2 when the positioning pin 2 is at the parking position (P) of an opening 3a formed in the positioning plate 3. Further, a key-lock-cable 6 which operates in conjunction with a key-interlock mechanism (not shown) is connected to the bell-crank 4.

When the above-described shift lever apparatus is in a steering-lock state in which the engine key is removed from the key-interlock mechanism, if a user tries, pressing the knob button, to move the positioning pin 2 downwards so that the positioning pin 2 moves from the parking position (P) toward a running position, the bell-crank 4 rotates clockwise. Consequently, a feeding force acts upon the key-lock-cable 6, thereby causing the cable 6 to stretch. Further, in the worst situation, there is concern that a lock in the key-interlock mechanism may be released.

Moreover, the slot width of the engaging slot 4a of the bell-crank 4 is set larger than the diameter of the positioning pin 2 so as to freely move the positioning pin 2 upwards and downwards. Consequently, the play generated between the positioning pin 2 and the engaging slot 4a results in play being generated when the key-lock-cable 6 is pushed or pulled by the bell-crank 4, thereby causing the function of the key-interlock mechanism to deteriorate.

Furthermore, the spring 8 is necessary to produce tension in the key-lock-cable 6 in the direction shown by the arrows in FIG. 1, whereby the positioning pin 2 and the bell-crank 4, respectively, are energized in substantially opposite directions. In this way, the upward energizing force on the positioning pin 2 must be set larger than the clockwise energizing force on the bell-crank 4 to produce tension in the key-lock-cable 6. Accordingly, the force to operate or press the knob button has to be relatively large, thereby resulting in poor operating characteristics in the shift lever 1.

SUMMARY OF THE INVENTION

In view of the above, an object of the present invention is to solve the aforementioned problems in the prior art through the introduction of a shift lever apparatus which can prevent the malfunction of the key-interlock mechanism while improving the function thereof and which can improve the operating characteristics of the shift lever. The above-mentioned object of the present invention is accomplished through a shift lever apparatus comprising: a positioning plate with a parking position and a running position; a shift lever pivotally supported on a vehicle body and provided with a rod, said rod being energized in a first direction by an energizing member; a positioning pin arranged on the rod and movable between the parking position and a running position; a first lever pivotally supported on the positioning plate by a shaft and provided with an arm, said arm of the first lever being positioned over the positioning pin positioned at the parking position; a second lever pivotally supported on the positioning plate by a shaft and provided with an arm, said arm of the second lever being positioned under the positioning pin positioned at the parking position; an energizing means for energizing the first and second levers so as to draw the arms of the first and second levers close together and to restrain the positioning pin positioned at the parking position; an actuator connected to and actuating the lock lever so as to rotate the lock lever in predetermined directions; a key-interlock mechanism for locking and unlocking the key of the vehicle, said key-interlock mechanism with a cable being connected to the first lever through a key-lock cable; and either a lock lever pivotally supported by a shaft which is at right angles to the shaft of the second lever and provided with an arm, said arm of the lock lever being engagable with the second lever by being pressed by the first lever so that the second lever can be stabilized under the positioning pin positioned at the parking position to lock the positioning pin at the parking position, or a lock lever pivotally supported by a shaft which is parallel to the shaft of the second lever and provided with an arm, said arm of the lock lever being pressed by the first lever when the positioning pin is positioned at the parking position so as to be stabilized under the positioning pin to lock the positioning pin at the parking position.

In a preferred embodiment of the shift lever apparatus which has the latter described lock lever according to the present invention, the second and lock levers have second ever lock means for preventing the second lever from being rotated when the positioning pin is moved from the running position toward the parking position.

In the above-described shift lever apparatus, even if the user tries to move the positioning pin from the parking position (P) toward the running positions while pressing the positioning pin downwards in a state in which the engine key is removed from the key-interlock mechanism, the downward movement of the positioning pin is prevented by the second lever stabilized by the lock lever or by the lock lever itself. In this state, since the force to move the positioning pin is transmitted only to the second lever or to the lock lever and only a small force acts upon the first lever, the key-lock cable does not move or operate, thereby preventing the malfunction of the key-interlock mechanism.

Further, since the positioning pin positioned at the parking position (P) is restrained by the first and second levers, there is no play between the positioning pin and the first and second levers, whereby the key-interlock mechanism can be precisely operated through the key-lock cable, thereby improving the function of the key-interlock mechanism.

Moreover, the force produced by the energizing means scarcely acts upon the positioning pin which is energized in the first direction. Specifically, there is no force acting upon the positioning pin in a second direction which is opposite to the first direction. Accordingly, it is possible to reduce the force for energizing the positioning pin in the first direction to a minimum. That is, it is possible to reduce the force for moving or shifting the shift lever to a minimum, thereby improving the operating characteristics of the shift lever.

Furthermore, in the shift lever apparatus which is provided with the second lever lock means, when the positioning pin is moved from the running position toward the parking position, the second lever does not adversely rotate due to the second lever lock means. Accordingly, the second lever lock means can facilitate smooth movement of the positioning pin while preventing the positioning pin from deviating to a side of the second lever which is opposite to the side for restraining the positioning pin, thereby improving the operating characteristics of the shift lever.

BRIEF DESCRIPTION OF THE DRAWINGS

FIG. 21 is an elevational view of the shift lever apparatus, showing the positioning pin at a lower position than in the state shown in FIG. 20.

DETAILED DESCRIPTION OF THE PREFERRED EMBODIMENTS

Figure 1:
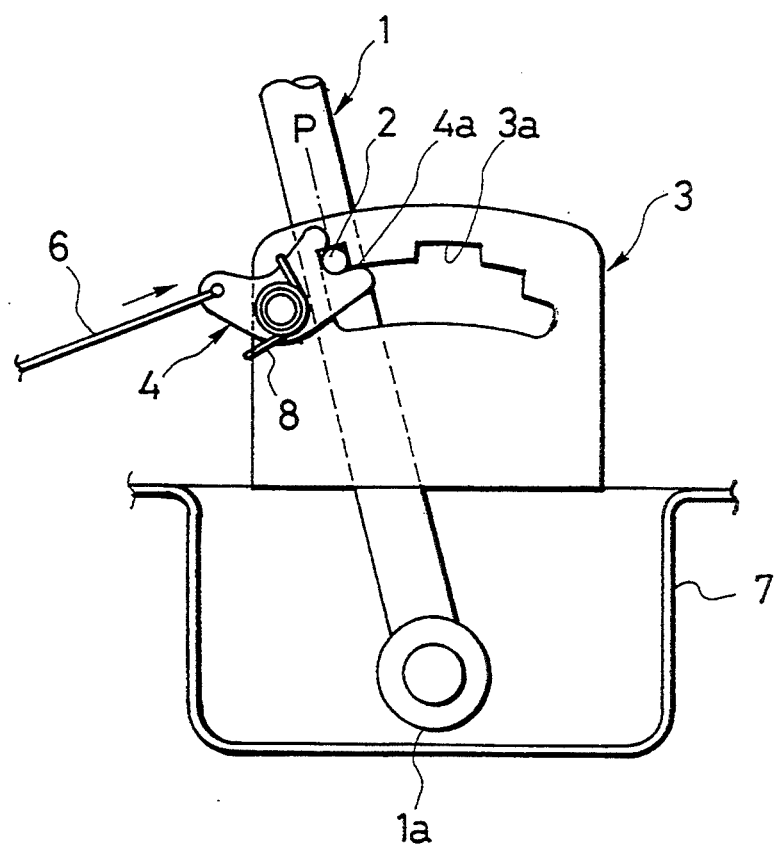
FIG. 1 is an explanatory elevational view of a shift lever apparatus according to a conventional example.

A shift lever apparatus according to the present invention will be described hereinafter with reference to FIGS. 2–21.

The below-described right and left sides or directions, and the upward and downward directions correspond, respectively, to the right and left sides or directions, and the upward and downward directions in FIGS. 2–5, 7–9, 11, 13–14 and 15–21. Further, members with the same reference numerals throughout FIGS. 2–21 should be considered as the same or similar members. FIRST EMBODIMENT A first embodiment according to the present invention will be explained hereinafter with reference to FIGS. 2–10.

Figure 2:
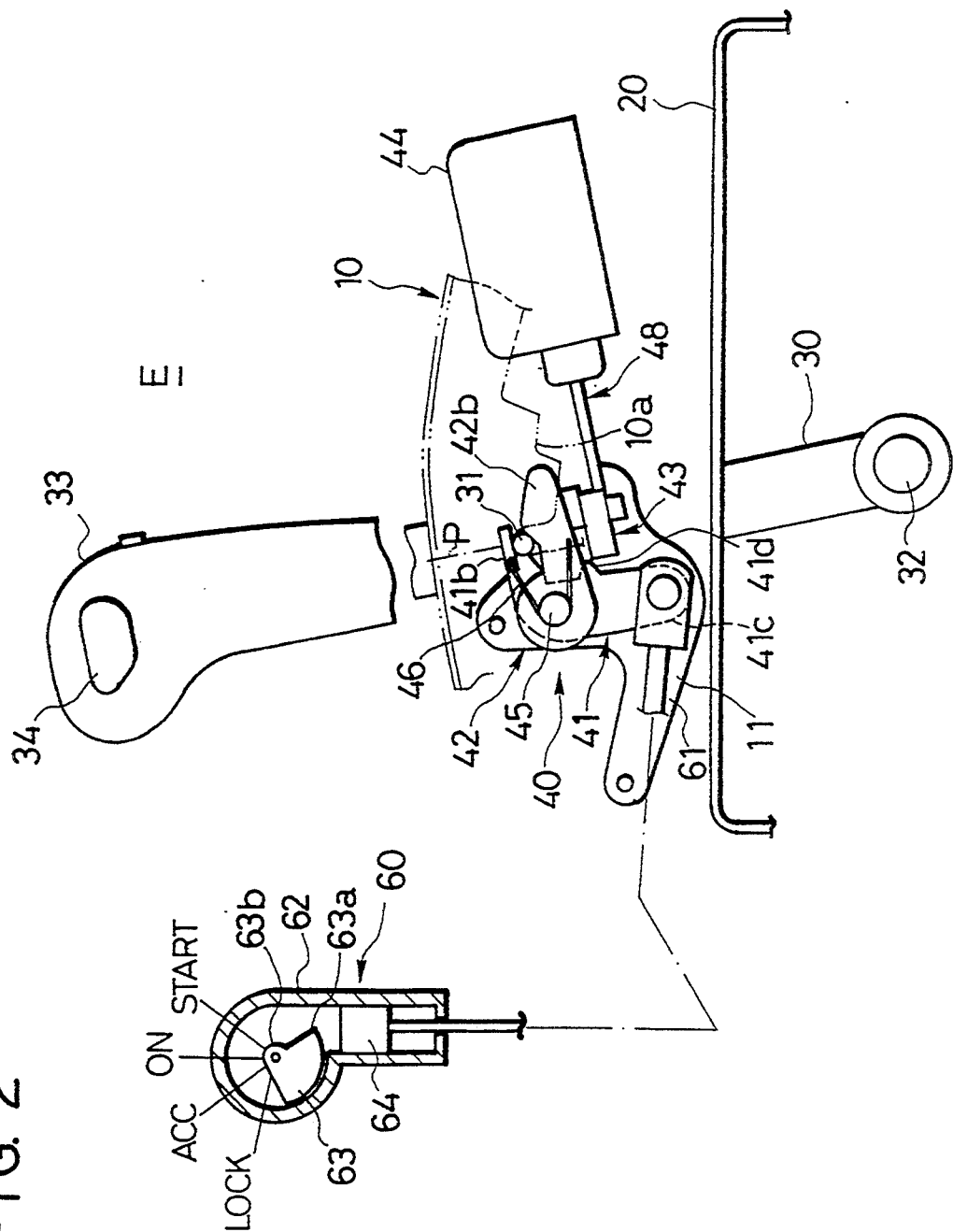
FIG. 2 is an explanatory elevational view of a shift lever apparatus according to a first embodiment of the present invention.

In FIG. 2, a shift lever apparatus E is used with an automatic transmission in a vehicle. The shift lever apparatus E includes a positioning pin 31 which is energized upwards at all times and which can engage with and can be released from an opening 10a having a plurality of positioning recesses formed in a positioning plate 10. Further, the shift lever apparatus E includes a shift lever 30 which is pivotally supported on a machine casing 20, a lock mechanism 40 for preventing the positioning pin 31 positioned at a parking position (P) from moving downwards, and a key-interlock mechanism 60 operating in conjunction with the lock mechanism 40.

A detailed explanation of the shift lever apparatus E will now be given. The positioning plate 10 is arranged on the machine casing 20 which is secured to the vehicle body. The positioning plate 10 is formed with the opening 10a having the plurality of positioning recesses relatively adjacent to the outer periphery thereof. The positioning recesses correspond to parking (P), reverse, neutral, drive, second-speed, and first-speed positions, respectively. The parking position (P) is located at the leftmost side of the opening 10a as shown in FIG. 2. In the following, the above-mentioned positions in the opening 10a except the parking position (P) will be referred to as running positions.

The base portion of the shift lever 30 which has a cylindrical form is pivotally supported on the machine casing 20 by a shaft 32. The positioning pin 31 is partly embedded in a rod (not shown) which is slidably arranged inside the shift lever 30 along the shift lever 30 and which is energized upwards by a rod spring (not shown) at all times. A knob 33 is secured to the upper end of the shift lever 30 and is provided with a knob button 34 which partly protrudes from the knob 33 and can be pressed toward the inside of the knob 33. When the knob button 34 is pressed against the force of the rod spring, the positioning pin 31 can move downwards.

The lock mechanism 40 includes a first operation lever 41, a second operation lever 42, a lock lever 43, and an actuator 44, which are formed as a unit on a bracket 11 secured to the positioning plate 10.

The first operation lever 41 has a bell-crank shape, specifically has an arm 41b and an arm 41c, and is pivotally supported at the base between the arm 41b and the arm 41c on the bracket 11 by a shaft 45. The arm 41b extends substantially to the right, namely toward the positioning pin 31, so that the bottom face of the arm 41 abuts the positioning pin 31 when the positioning pin 31 is positioned at the parking position (P). The distal end of the arm 41c of The first operation lever 41 is connected to the end of a key-lock cable 61 which is connected to the key-interlock mechanism 60, by a securing shaft. The key-lock cable 61 is a push-pull cable.

Figure 6:
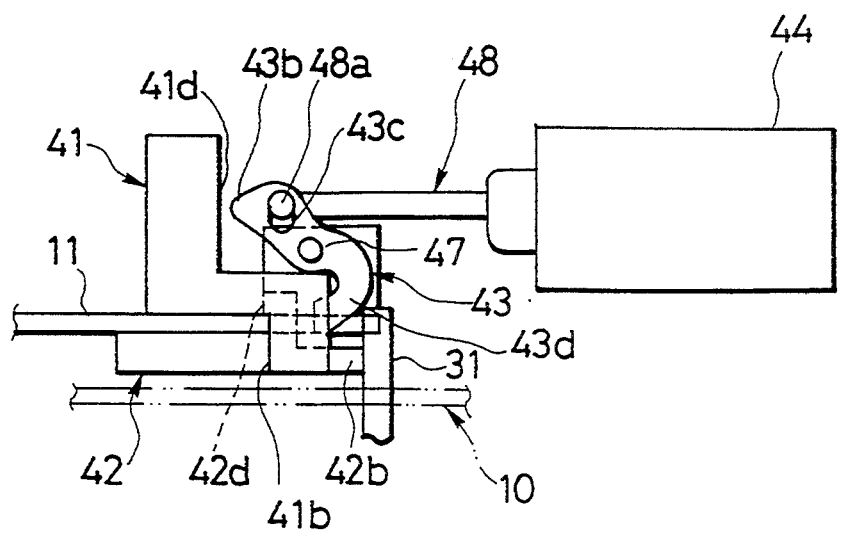
FIG. 6 is a plan view of the shift lever apparatus in the state shown in FIG. 5.

The second operation lever 42 has a base and an arm 42b. The base of the second operation lever 42 is pivotally supported on the bracket 11 by the shaft 45 which also supports the first operation lever 41. However, the second operation lever 42 could be supported by a shaft other than the shaft 45. The arm 42b extends substantially to the right, namely toward the positioning pin 31, so as to be located under and facing the arm 41b of the first operation lever 41. Further, the arm 42b has a projection 42d projecting in the direction in which the shaft 45 of the first and second operation levers 41, 42 extends, i.e., extending toward the lock lever 43, as shown in FIG. 6.

The arm 41b of the first operation lever 41 and the arm 42b of the second operation lever 42 are energized by a helical torsion spring 46 wound around the shaft 45 so as to draw the arms 41b, 42b close together. Specifically, the arm 41b and the arm 42b are constructed so as to press and face each other across the positioning pin 31 positioned at the parking position (P).

Figure 10:
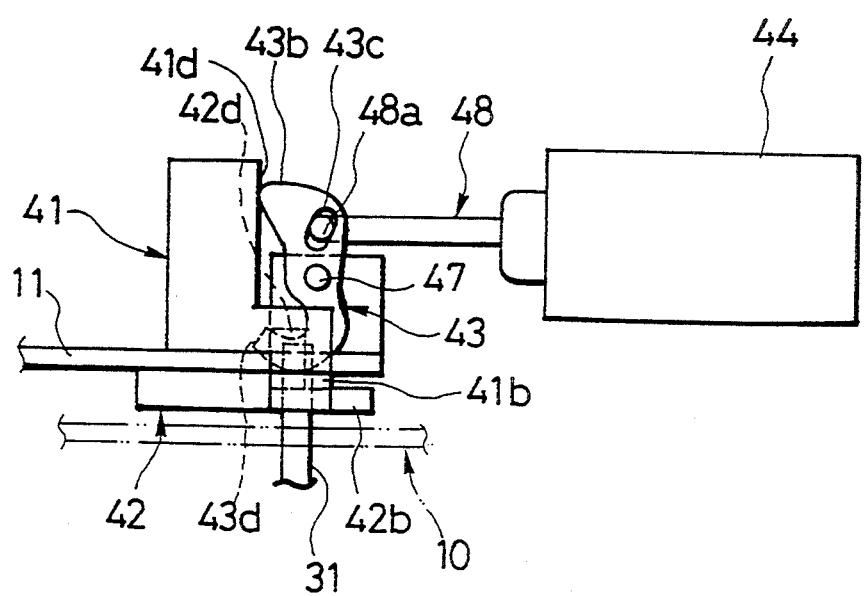
FIG. 10 is a plan view of the shift lever apparatus in the state shown in FIG. 9.
Figure 11:
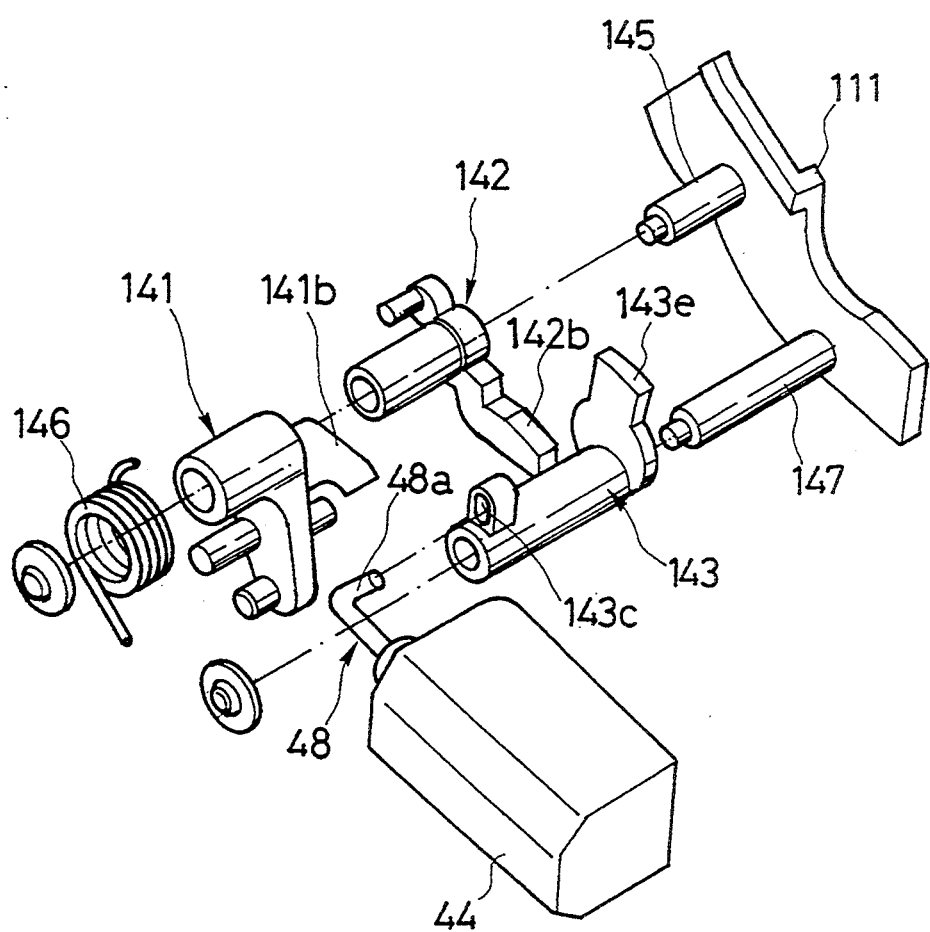
FIG. 11 is an exploded perspective view of a shift lever apparatus according to a second embodiment of the present invention.
Figure 12:
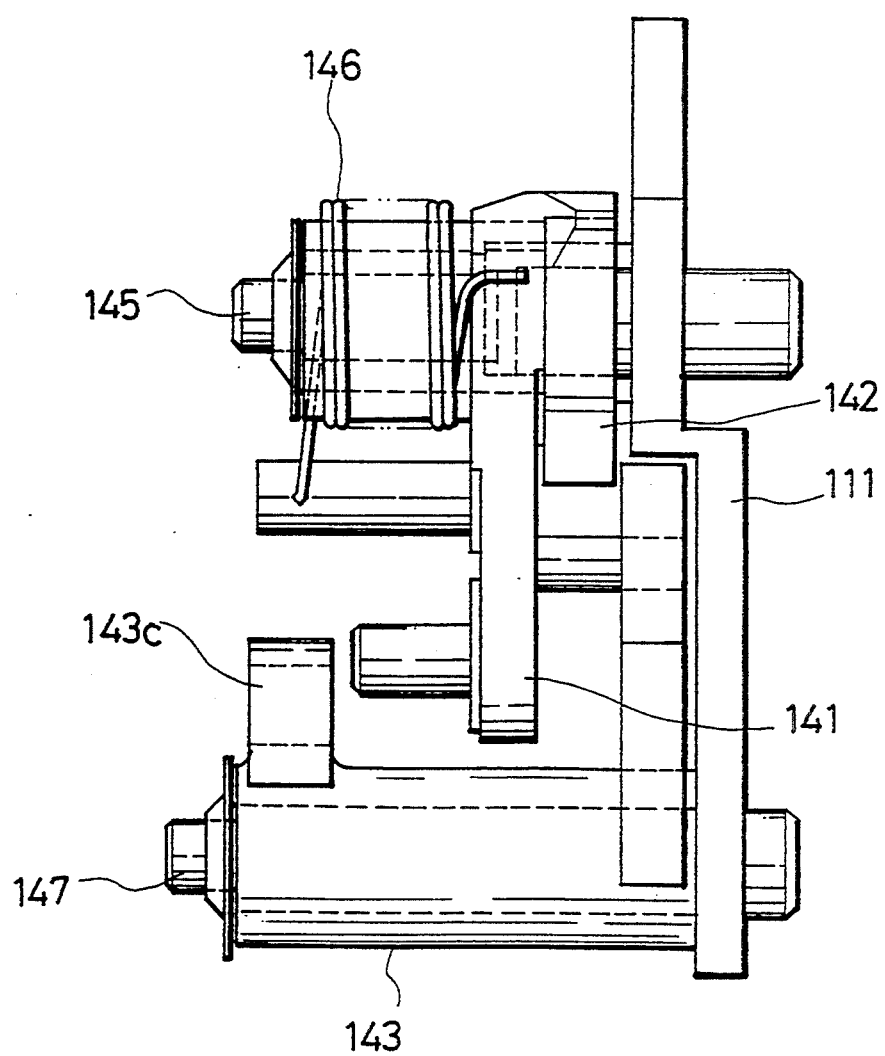
FIG. 12 is a plan view of the shift lever apparatus shown in FIG. 11.

The lock lever 43 has a bell-crank shape, and its base is pivotally supported on the bracket 11 by the shaft 47 which extends at right angles to the shaft 45. An arm 43b of the lock lever 43 is provided with a slot 43c with which a hook portion 48a provided in a plunger 48 of the actuator (which will be described later) 44 is engaged. The other arm 43d of the lock lever 43 is located at a position opposite to the bottom face of the projection 42d of the second operation lever 42 when the positioning pin 31 is at the parking position (P), in response to the rotation of the lock lever 43, as shown in FIG. 10. A projection 41d is provided in the first operation lever 41 to oppose against the arm 43b.

The actuator 44, for example, a solenoid 44 with the plunger 48, is secured to the positioning plate 10. The plunger 48 which is partly contained inside the solenoid 42 is energized by a spring (not shown) so as to exit the solenoid 44. The hook portion 48a formed in the distal end of the plunger 48 is engaged with the slot 43c in the arm 43b of the lock lever 43 as shown in FIG. 6.

When a lever welded to the shift lever 30 abuts a contact point of a microswitch (not shown), the solenoid 44 is turned on or is excited and the plunger 48 enters the solenoid 44. In this on state of the solenoid 44, the lock lever 43 rotates clockwise in FIGS. 6 and 10 so that the arm 43d can be located directly under the bottom face of the projection 42d of the second operation lever 42 which is positioned at a specific position when the positioning pin 31 is positioned at the parking position (P).

Further, the solenoid 44 is turned off when a brake pedal is pressed before the vehicle is started. In this off state of the solenoid 44, the plunger 48 is caused to exit the solenoid 44 by the spring so as to rotate the lock ever 43 counterclockwise in FIG. 6 and to allow the arm 43d to be withdrawn from under the bottom face of the projection 42d of the second operation lever 42 which is positioned at a specific position when the positioning pin 31 is positioned at the parking position (P).

A cylinder lock, as the key-interlock mechanism 60, includes a key cylinder 62 containing a key rotor 63 into which an engine key is inserted and rotated. The key rotor 63 is rotatable to a lock position (LOCK) for locking the steering of the vehicle at which the engine key can be removed, an accessory position (ACC) for enabling use of electrical equipment in the vehicle with the engine stopped, an on position (ON) for operation of the engine, and a start position (START) for starting the engine.

Figure 4:
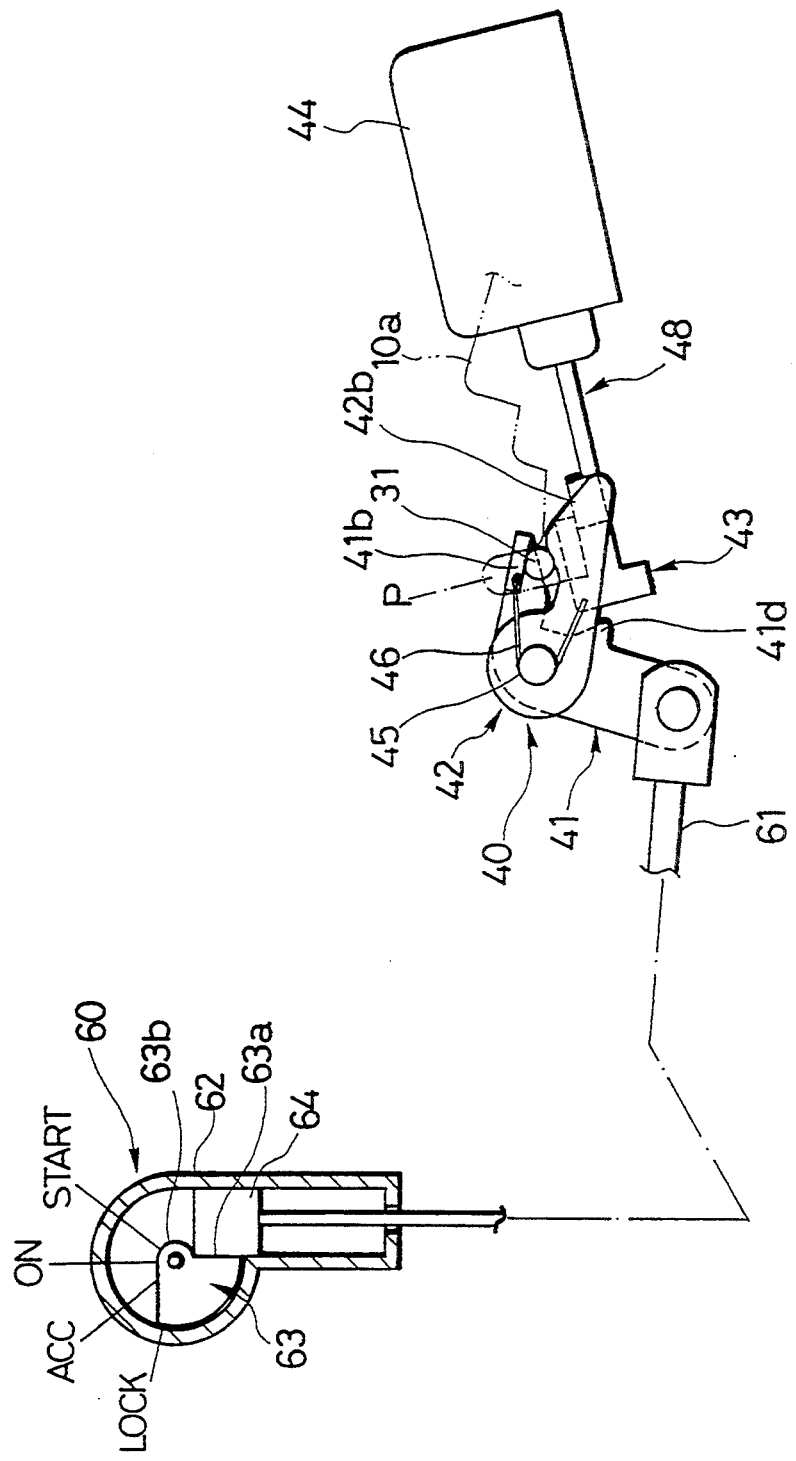
FIG. 4 is an elevational view showing the state in which the positioning pin shown in FIG. 3 is unlocked.

The key cylinder 62 is provided thereinside with a stopper 64 which is connected to the first operation lever 41 through the key-lock cable 61. The stopper 64 can be moved deeply inside of the key cylinder 62 and can be positioned at a lock position set for preventing the key rotor 63 from moving from the on position (ON) toward the lock position (LOCK) as shown in FIG. 4 since the key-lock cable 61 is pushed toward the key-interlock mechanism 60.

Figure 3:
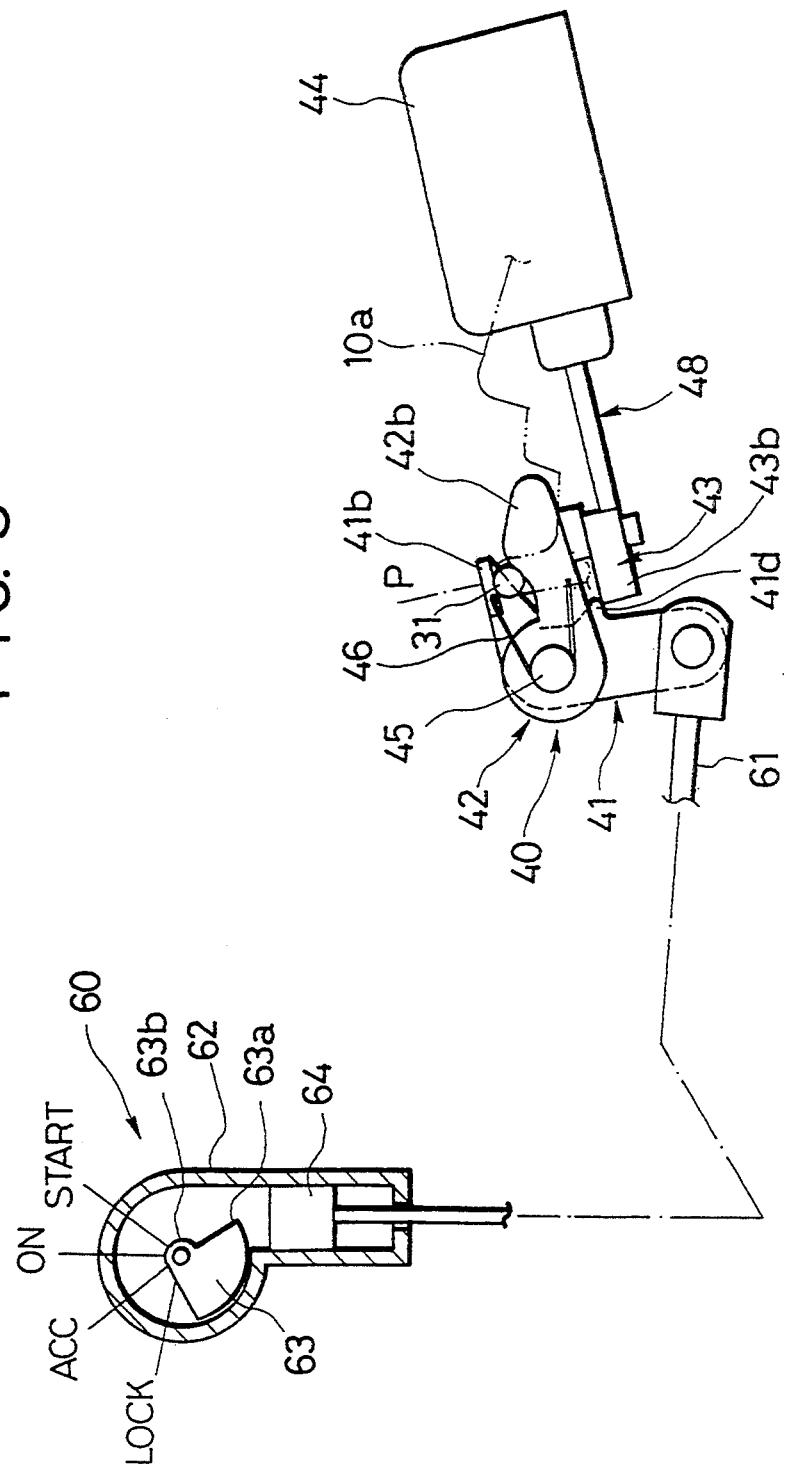
FIG. 3 is a partial elevational view of the shift lever apparatus illustrated in FIG. 2, showing the state in which a positioning pin is locked.

When the first operation lever 41 which operates in conjunction with the second operation lever 42 and the lock lever 43 so as to move to a position set for preventing the positioning pin 31 positioned at the parking position (P) from moving downwards, since the key-lock cable 61 can be pulled from the key-interlock mechanism 60, the stopper 64 moves downwards to an unlock position set for allowing the key rotor 63 to freely rotate, as shown in FIGS. 2 and 3.

The key rotor 63 is provided with a restricting portion 63a which prevents the stopper 64 from moving toward the lock position of the stopper 73 when the key rotor 63 is rotated to the lock position (LOCK). Further, the key rotor 63 is provided with a position-restrict portion 63b which, when the stopper 73 is positioned at its lock position, prevents the stopper 73 from further moving beyond its lock position as shown in FIG. 4.

In the above-described configuration, the first operation lever 41, the second operation lever 42, and the lock lever 43 which form the lock mechanism 40 may be directly secured to the positioning plate 10.

Next, the operation and effect of this first embodiment will be explained hereinafter.

First, the operation of the lock mechanism 40 will be explained.

Figure 5:
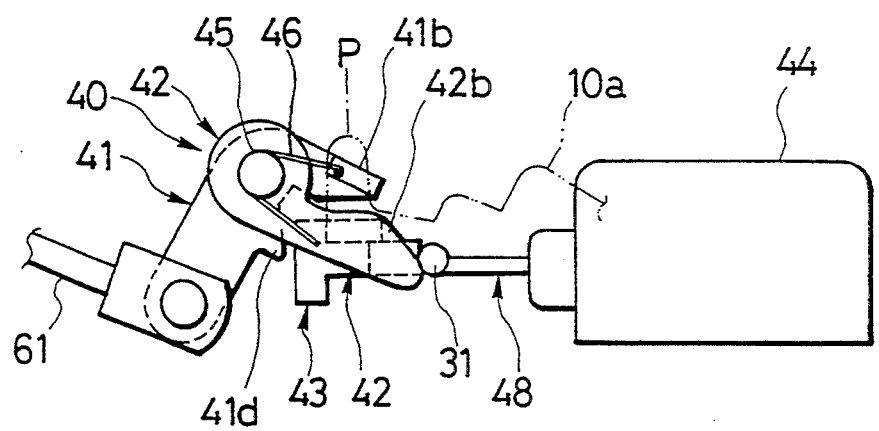
FIG. 5 is an elevational view showing the state in which the positioning pin is unlocked.

The user, while pressing the knob button 34, moves the shift lever 30 so that the positioning pin 31 is directed toward the parking position (P), as shown in FIG. 5. In this way, the positioning pin 31 abuts the upper face of the arm 42b of the second operation lever 42. In this state, the solenoid 44 is in the off state and energizes the plunger 48 so that the plunger 48 exits the solenoid 44. Further, the arm 43d of the lock lever 43 is maintained at the position at which the arm 43d is withdrawn from the bottom face of the projection 42d of the second operation lever 42 as shown in FIG. 6.

Figure 7:
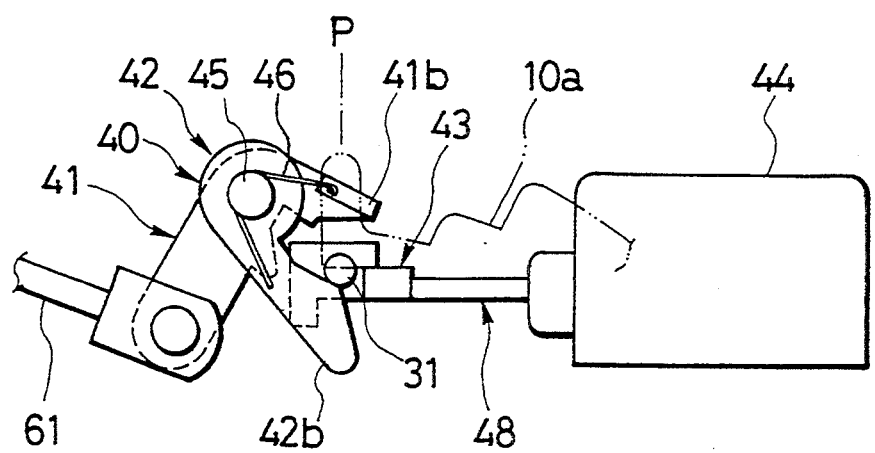
FIG. 7 is an elevational view showing the state in which the positioning pin is unlocked.

After the shift lever 30 is further moved so that the positioning pin 31 is directed toward the parking position (P), the positioning pin 31 is located under the parking position (P) while the arm 42b of the second operation lever 42 is pressed against the spring force of the helical torsion spring 46 as shown in FIG. 7.

When the positioning pin 31 is then located closer to the parking position (P), the positioning pin 31 is restrained by the arm 41b of the first operation lever 41 and the arm 42b of the second operation lever 42. In this state, the force of the rod spring provided inside the shift lever 30 only acts upon the knob button 34.

Figure 9:
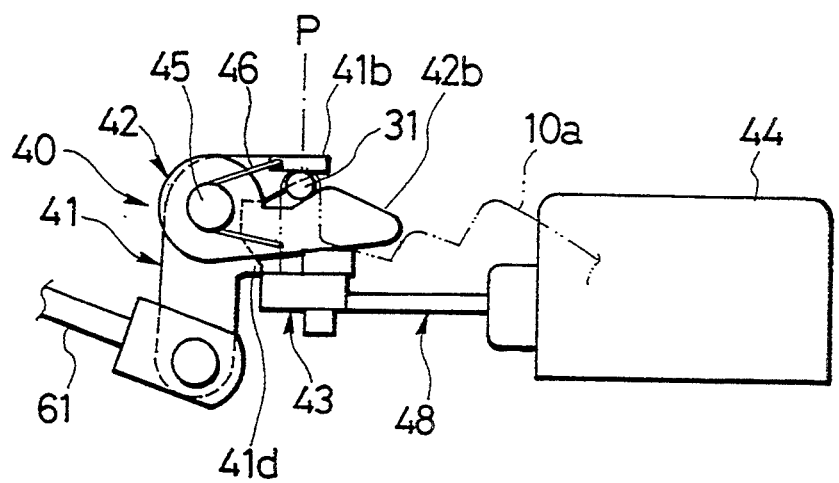
FIG. 9 is an elevational view showing the state in which the positioning pin is locked.

After the user takes his finger off the knob button 34, the positioning pin 31 engages the upper end of the opening 10a of the parking position (P) as shown in FIG. 9. At the same time, the lever provided on the shift lever 30 abuts the contact point of the microswitch, the solenoid 44 is excited, and the plunger 48 enters the solenoid 44. As a result, the lock lever 43 rotates clockwise in FIG. 10 and the arm 43d of the lock lever 43 moves to a position at which the arm 43d abuts the bottom face of the projection 42d of the second operation lever 42.

Next, the operation of the key-interlock mechanism 60, i.e., the cylinder lock, will be explained.

(i) PARKING STATE (LOCKING STATE)

Referring to FIG. 3, during the parking period in which the shift lever 30 is shifted so that the positioning pin 31 is positioned at the parking position (P) and the engine key is removed from the cylinder lock 60, the positioning pin 31 is restrained by the arm 41b of the first operation lever 41 and the arm 42b of the second operation lever 42. Meanwhile, although the solenoid 44 remains turned off, the projection 41d of the first operation lever 41 presses the arm 43b of the lock lever 43 so as to rotate the lock lever 43 counterclockwise in FIG. 10. Thus, the arm 43d moves to a position at which the arm 43d abuts the bottom face of the projection 42d of the second operation lever 42, while locking the second operation lever 42, namely the shift lever 30.

In this state, even if the user, while pressing the knob button 34, tries to move the positioning pin 31 downwards, the positioning pin 31 is prevented from being moved downwards by the second operation lever 42 which is stabilized by the lock lever 43. Accordingly, it is impossible for the shift lever 30 to be shifted to allow the positioning pin 31 to move from the parking position (P) toward the running positions.

As explained above, even if the user tries to depress the positioning pin 31 which is at the parking position (P) to move to the running positions while the engine key is removed, the downward movement of the positioning pin is prevented by the operation in conjunction with the second operation lever 42 and the lock lever 43.

In this state, the force to move the positioning pin 31 is transmitted only to the second operation lever 42 and the lock lever 43 and only a small amount of force produced by the helical torsion spring 46 acts upon the first operation lever 41. Accordingly, the key-lock cable 61 does not operate thereby preventing the malfunction of the key-interlock mechanism 60.

(ii) ENGINE START

In order to start the engine, the engine key is inserted into the cylinder lock 60 and is rotated so that the key rotor 63 rotates toward the on position (ON). As a result, the restricting portion 63a is withdrawn from a position located along the direction in which the stopper 64 slides as shown in FIG. 4. In this state, even though the stopper 64 could move upwards, the first operation lever 41, which is being pressed by the positioning pin is stabilized in a position as shown in FIG. 3.

In this state, when the brake pedal 92 is depressed after the engine is started, the solenoid 44 is turned off, whereby the plunger 48 exits the solenoid. As a result, the lock lever 43 is rotated counterclockwise in FIG. 6, thereby withdrawing the arm 43d of the lock lever 43 from the bottom face of the projection 42d of the second operation lever 42.

In this off state, when the user presses the knob button 34 to direct the positioning pin 31 downwards, since the stopper 64 is in a state allowing upward movement, the first operation lever 41 and the second operation lever 42 rotates clockwise as shown in FIGS. 4 and 5, whereby the shift lever 30 can be shifted to move the positioning pin 31 from the parking position (P) toward the running positions, thereby allowing the vehicle to run.

Figure 8:
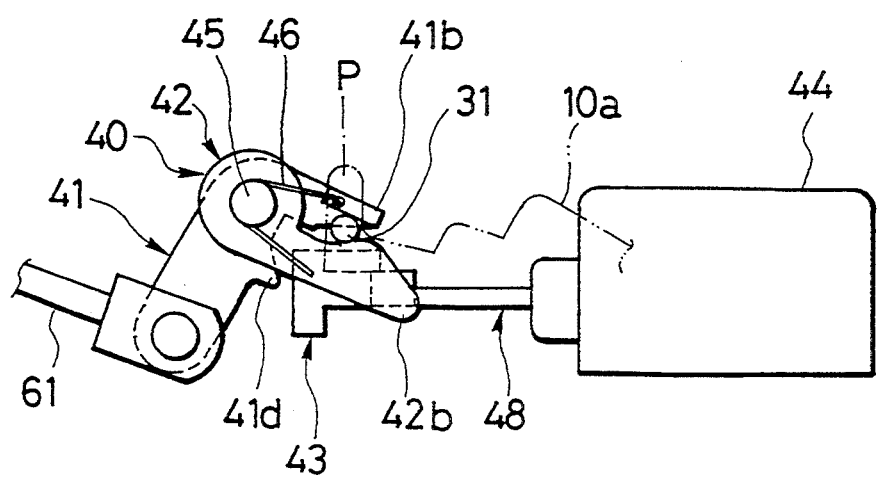
FIG. 8 is an elevational view showing the state in which the positioning pin is unlocked.

In the above-described driving state, in order to remove the engine key, first, the positioning pin 31 is moved from the running position toward the parking position (P) while the shift lever 30 is shifted as shown in FIGS. 7-9. By this operation, the lever on the shift lever 30 abuts the contact point of the microswitch. As a result, the solenoid 44 is turned on while causing the plunger 48 to enter the solenoid 44, whereby the lock lever 43 rotates clockwise in FIG. 10. As a result, the arm 43d of the lock lever 43 moves to a position at which the arm 43d abuts the bottom face of the projection 42d of the second operation lever 42 which presses the positioning pin 31 positioned at the parking position (P) upwards. At the same time, the stopper 64 is pulled by the first operation lever 41 through the cable 61 so as to be at its unlocked position, whereby it becomes possible for the key rotor 63 to rotate toward the lock position (LOCK) as shown in FIG. 3. Finally, the engine key can be removed.

In the above-explained first embodiment, even if the user tries to move the positioning pin 31 from the parking position (P) toward the running positions while pressing the positioning pin 31 downwards in a state in which the engine key is removed from the cylinder lock 60, the down movement of the positioning pin 31 is prevented by the second operation lever 42 stabilized by the lock lever 43. In this state, since the force to move the positioning pin 31 is transmitted only to the second operation lever 42 and only a small amount of force acts upon the first operation lever 41, the key-lock cable 61 does not operate thereby preventing a malfunction of the key-interlock mechanism 60.

Further, since the positioning pin 31 positioned at the parking position (P) is restrained by the first and second operation levers 41, 42, there is no play between the positioning pin 31 and the first and second operation levers 41, 42, whereby the key-interlock mechanism 60 can be precisely operated through the key-lock cable 61, thereby improving the function of the key-interlock mechanism 60.

Moreover, as explained above, since the force produced by the helical torsion spring 46 acts only slightly upon the first operation lever 41 to rotate the first operation lever 41 clockwise, there is only a small amount of force for moving the positioning pin 31 positioned at the parking position (P) downwards against the force of rod spring acting upon the positioning pin 31. Accordingly, It is possible to reduce as small a spring force for energizing the positioning pin 31 upwards as possible, whereby it becomes possible to reduce as small the force for moving or shifting the shift lever 30 as possible, thereby improving the operating characteristics of the shift lever 30.

SECOND EMBODIMENT

A second embodiment according to the present invention will be explained hereinafter with reference to FIGS. 11–14.

In this second embodiment, a lock lever 143 is pivotally supported by a shaft 147, and a first operation lever 141 and a second operation lever 142 are pivotally supported by a shaft 145 on the bracket 111. The shafts 147, 145 extend in the same direction. The lock lever 143 is provided on the upper part thereof with a lock portion 143e forming a part of a circle of which the shaft 147 is the center.

Figure 13:
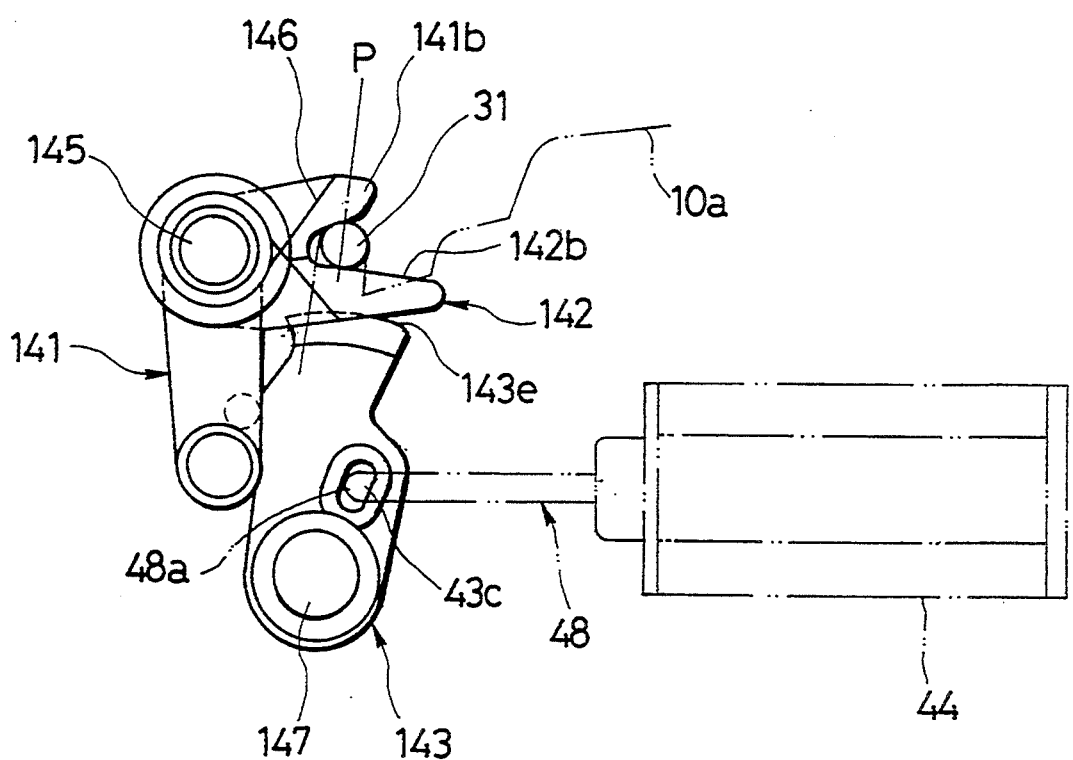
FIG. 13 is a partial elevational view of the shift lever apparatus illustrated in FIG. 11, showing the state in which a positioning pin is locked.

Referring to FIG. 13, the lock lever 143 and the first and second operation levers 141, 142 are constructed so that the positioning pin 31 positioned at the parking position (P) can be directly locked by the lock portion 143e of the lock lever 143.

Figure 14:
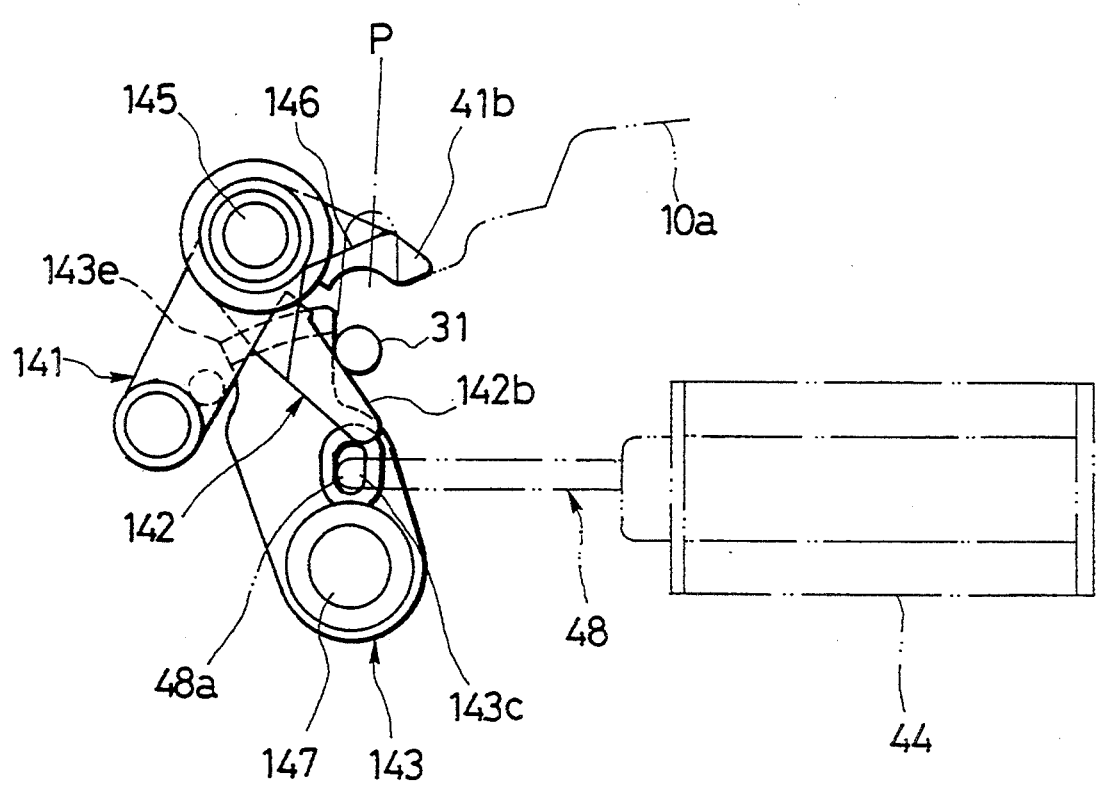
FIG. 14 is an elevational view of the shift lever apparatus, showing the state in which a positioning pin is unlocked.

In order to release the locking state as shown in FIG. 13 and to reach the unlocking state as shown in FIG. 14, the solenoid 44 is turned off while the plunger 48 exits the solenoid 44, thereby rotating the lock lever 143 counterclockwise in a manner similar to that explained in the first embodiment.

The further detailed configuration and operation of this embodiment is similar to that of a below described third embodiment, and therefore will be understood from the explanation of the third embodiment. In addition, the effects of this second embodiment are similar to those of the first embodiment, so no further description is given here.

THIRD EMBODIMENT

The third embodiment according to the present invention, which is an embodiment further developed based upon the configuration of the second embodiment, will be explained hereinafter with reference to FIGS. 15–21.

First, the configuration regarding a shift lever apparatus E', which is used with an automatic transmission in a vehicle, will be described in detail.

Figure 15:
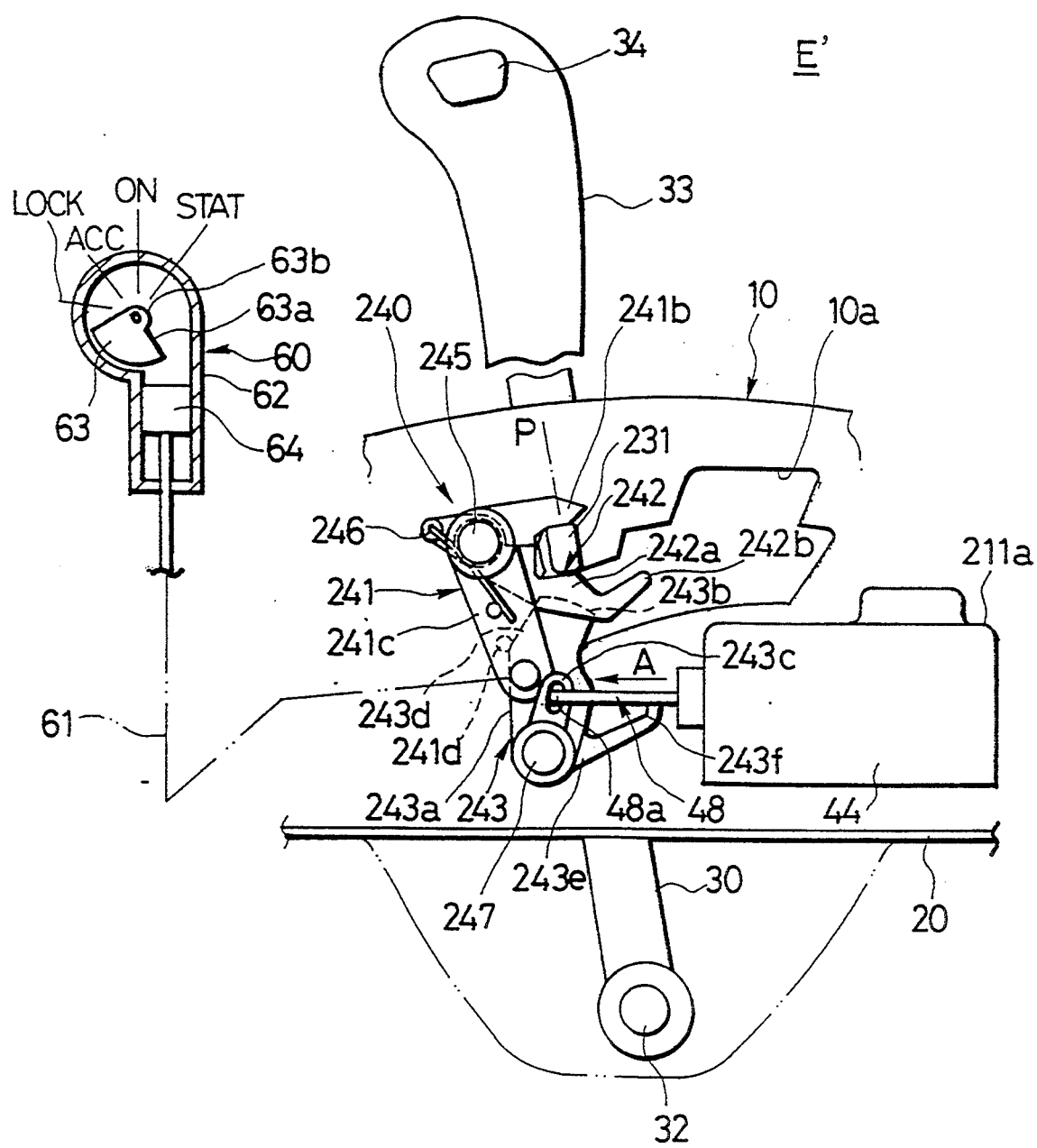
FIG. 15 is an explanatory elevational view of a shift lever apparatus, showing the state in which a positioning pin is locked, according to a third embodiment of the present invention.

Referring now to FIG. 15, the shift lever apparatus E' includes a lock mechanism 240 for preventing the positioning pin 231 positioned at a parking position (P) from moving downwards, and a key-interlock mechanism 60 which operates in conjunction with the lock mechanism 240. The lock mechanism 240 includes a key-lock lever 241, a support lever 242, a lock lever 243, and the actuator 44 and is formed as a unit on a bracket 211 secured to the positioning plate 10.

The key-lock lever 241 has a bell-crank shape, specifically has an arm 241b and an arm 241c, and is pivotally supported at the base thereof on the bracket 211 by a shaft 245. The arm 241b extends substantially to the right, namely toward the positioning pin 231, so that the bottom face of the arm 241 abuts the positioning pin 231 when the positioning pin 231 is positioned at the parking position (P). The distal end of the arm 241c of the key-lock lever 241 is connected to the end of a key-lock cable 61 which is connected to the key-interlock mechanism 60, by a securing shaft.

The support lever 242 has a base and an arm 242a. The base of the support lever 242 is pivotally supported on the bracket 211 by the shaft 245 (by which the key-lock lever 241 is also supported). The arm 242a extends substantially to the right, namely toward the positioning pin 231, so as to be located under and facing the arm 241b of the key-lock lever 241. That is, the arm 241b of the key-lock lever 241 and the arm 242a of the support lever 242, respectively, are located in the upper side and the lower side of the positioning pin 231 positioned at the parking position (P). Further, the arm 241b of the key-lock lever 241 and the arm 242a of the support lever 242 are energized by a helical torsion spring 246 wound around a boss section 241a formed in the base of key-lock lever 241 so as to be drawn close together. By this energizing torsion spring 246, the key-lock lever 241 and the support lever 242 are constructed so as to rotate integrally.

The lock lever 243 has a bell-crank shape, and its base is pivotally supported on the bracket 211 by the shaft 247. The top face of an arm 243a of the lock lever 243 forms a lock portion 243b with a part of a circle circling the axis of the shaft 247. The left side face of the arm 243a of the lock lever 243 forms a cam face 243d, which abuts a pin 241d embedded in the arm 241c of the key-lock lever 241. The cam face 243d serves to rotate the lock lever 243, while operating in conjunction with the key-lock ever 241, so as to allow the positioning pin 231 positioned at the parking position (P) to move downwards. The other arm 243e of the lock lever 243 is provided with a hook portion 243f which is constructed so as to engage a hook portion 242b formed at the distal end of the arm 242a of the support lever 242 when the lock mechanism 240 is in the unlocking state.

Figure 16:
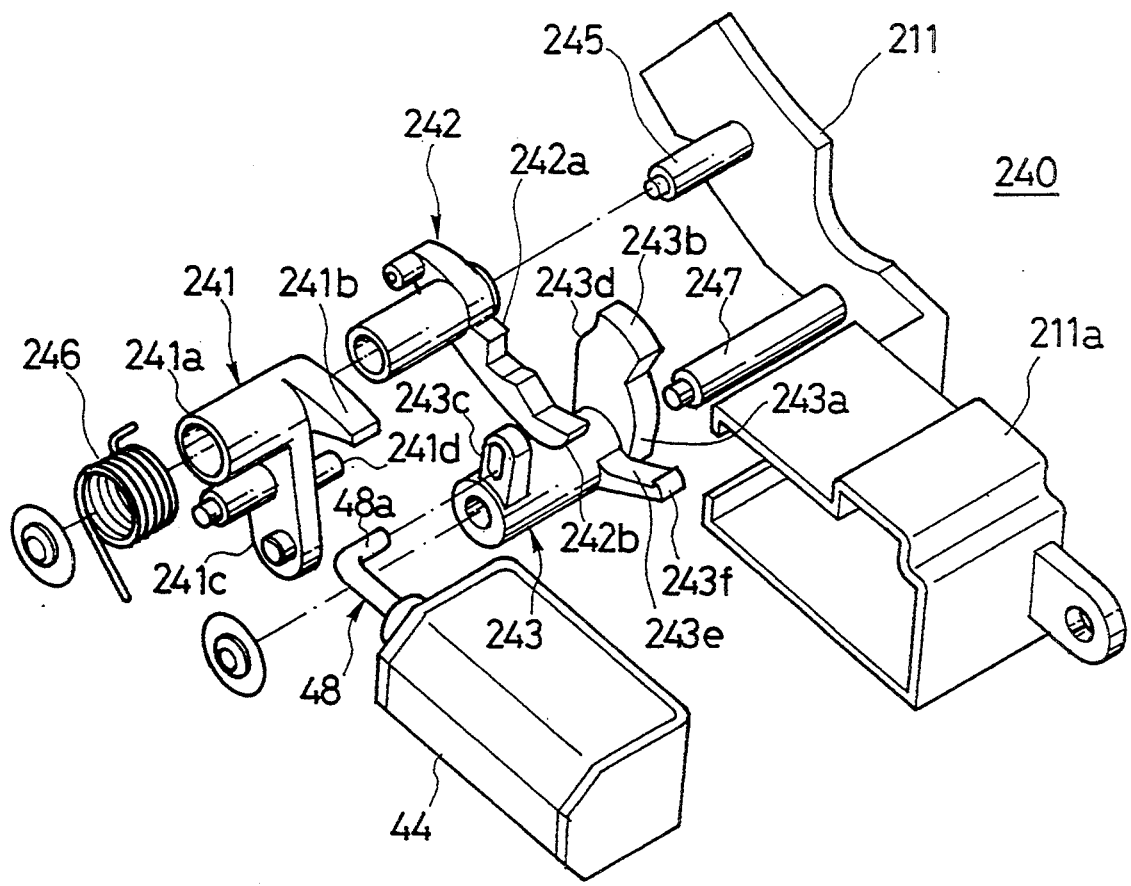
FIG. 16 is an exploded perspective view of the shift lever apparatus illustrated in FIG. 15.

The solenoid 44 is housed inside a solenoid case 211a which is integrally formed with the bracket 211 as shown in FIG. 16. The hook portion 48a of the plunger 48 of the solenoid 44 engages a slot 243c provided in the base of the lock lever 243.

Figure 18:
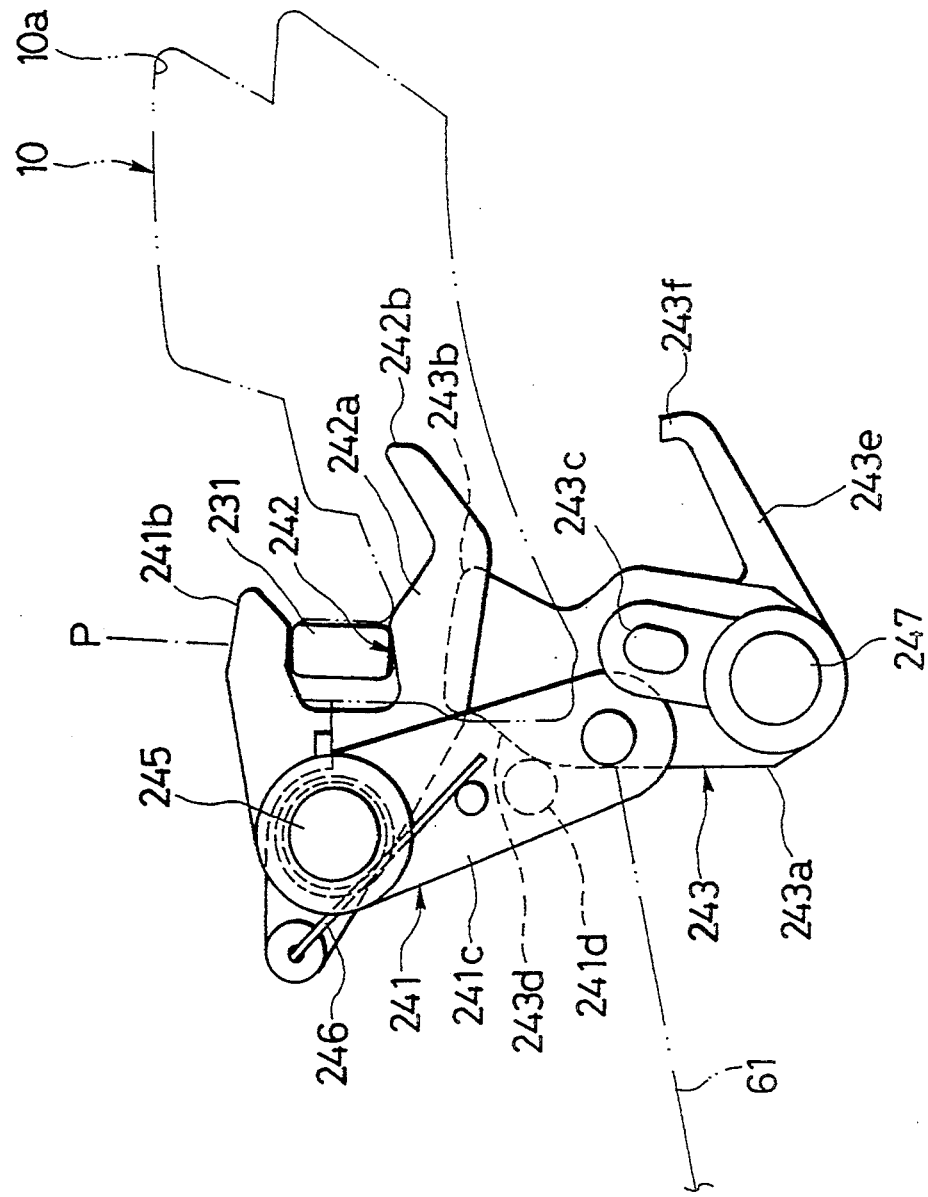
FIG. 18 is a partial enlarged elevational view of the shift lever apparatus Illustrated in FIG. 15, showing the state in which the positioning pin is locked.

The solenoid 44 in its on state, i.e., in the state in which the plunger 48 enters the solenoid 44, rotates the lock lever 243 clockwise so as to move the lock portion 243b of the lock lever 243 opposite to the positioning pin 231 positioned at the parking position (P) as shown in FIGS. 15 and 18.

Figure 17:
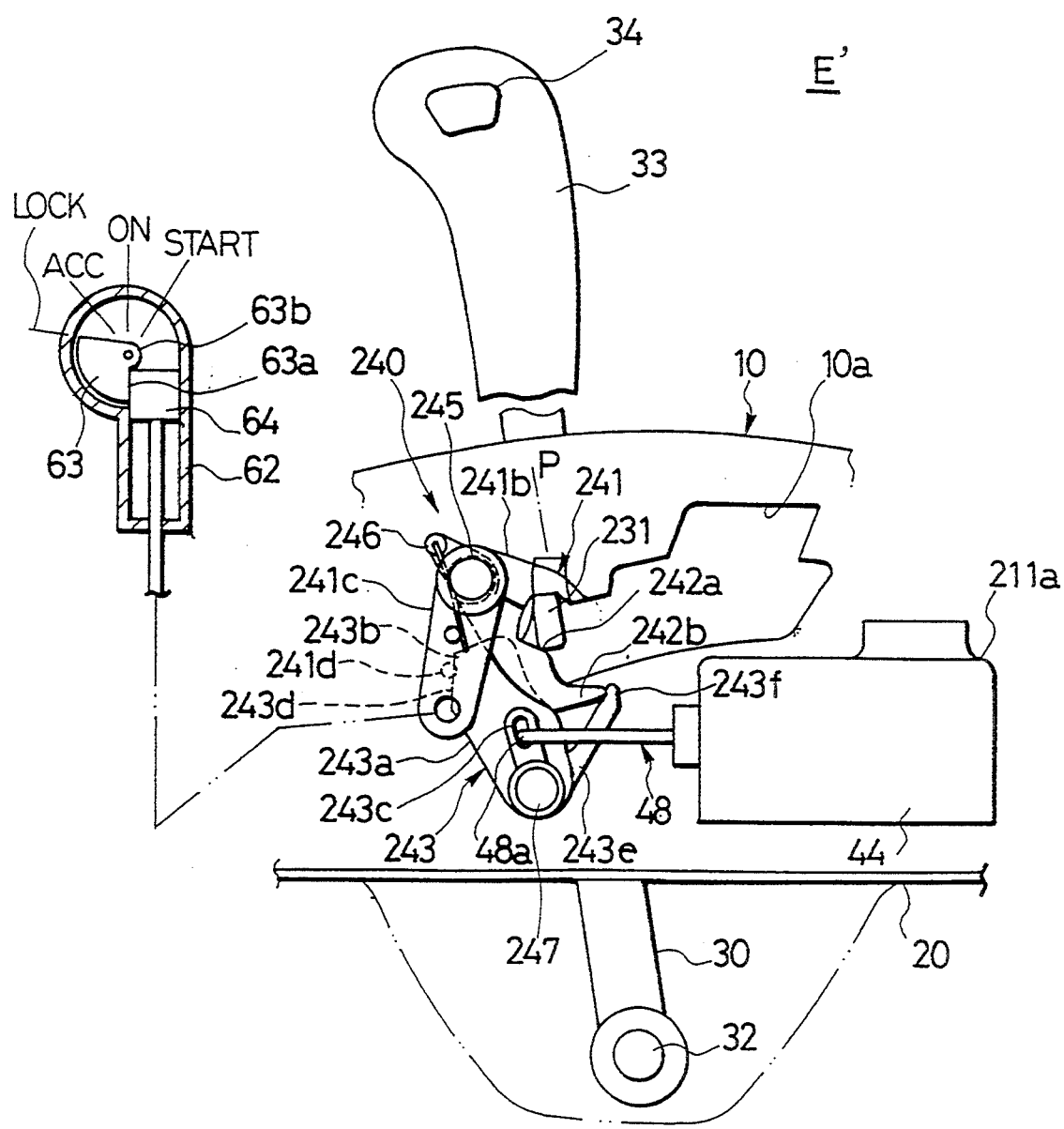
FIG. 17 is an explanatory elevational view of a shift lever apparatus, showing the state in which the positioning pin shown in FIG. 15 is unlocked.
Figure 20:
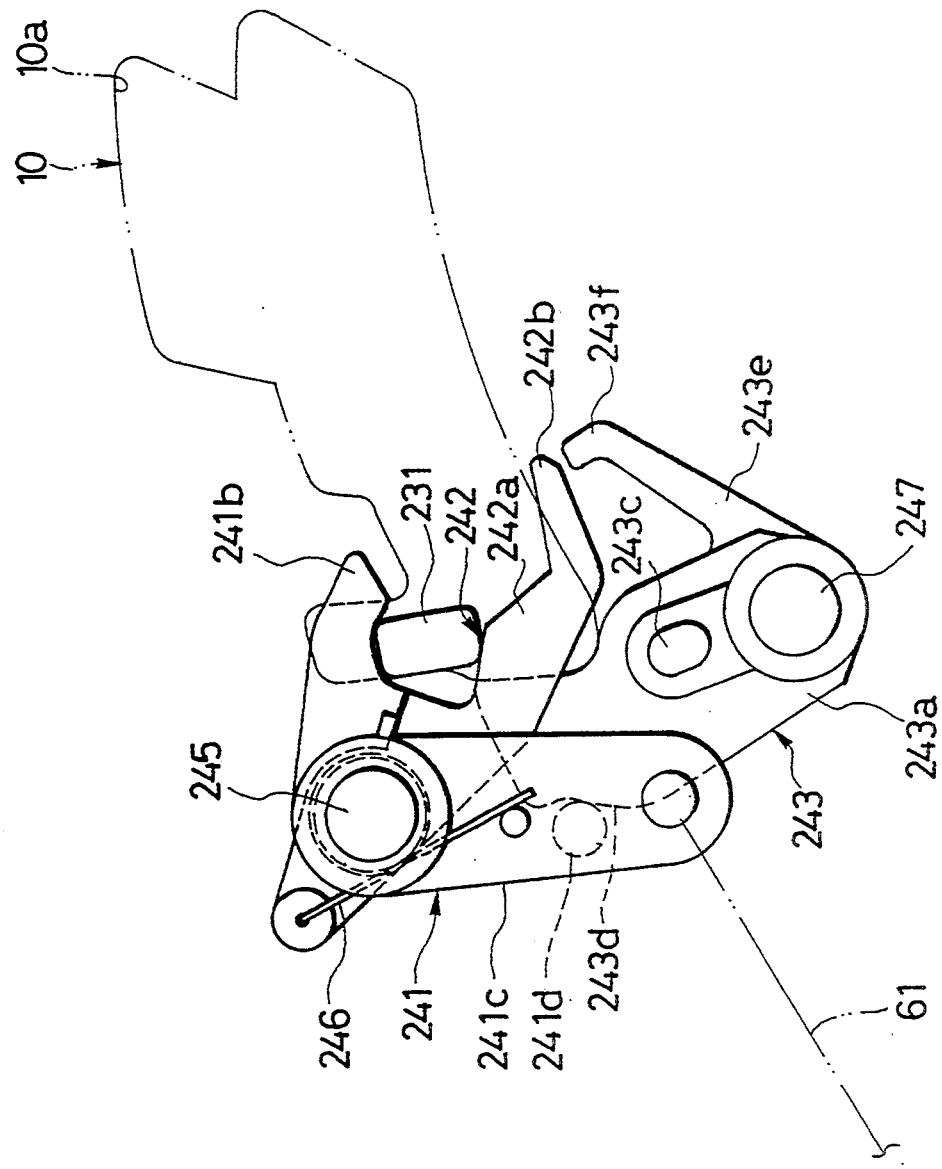
FIG. 20 is an elevational view of the shift lever apparatus, showing the positioning pin at a lower position than in the state shown in FIG. 19.

On the other hand, the solenoid 44 in its off state, i.e., in the state in which the plunger 48 exits the solenoid 44, rotates the lock lever 243 counterclockwise so as to withdraw the lock portion 243b from the way on which the positioning pin 231 moves from the parking position (P) as shown in FIGS. 17, 20, and 21.

In the state in which downward movement of the positioning pin 231 positioned at the parking position (P) is prevented by the lock portion 243b of the lock lever 243, namely, in the locking state of the lock mechanism 240, since the key-lock cable 61 is pulled toward the lock mechanism 240 by the key-lock lever 241, the stopper 64 moves downwards to the unlock position at which the key rotor 63 is allowed to freely rotate in the cylinder lock 60, as shown in FIG. 15.

In the above-described configuration, the key-lock lever 241, the support lever 242, the lock lever 243, and the solenoid 44 which form the lock mechanism 240 may be directly secured to the positioning plate 10 without utilizing the bracket 211.

Next, the operation and effect of this third embodiment will be explained hereinafter.

Referring to FIGS. 15 and 18, during the parking period, the arm 241b and the arm 242a of the key-lock lever 241 and the support lever 242, oppose the positioning pin 231 positioned at the parking position (P). Specifically, the arm 241b and the arm 242a are positioned over and under the pin 231, respectively, while restraining the pin 231. Meanwhile, although the solenoid 44 remains turned off, since the positioning pin 231 at parking position (P) presses the arm 241b of the key-lock lever 241 upwards, the arm 241c of the key-lock lever 241 is stabilized at a position as shown in FIG. 18. Therefore, the key-lock cable 61 is pulled toward the lock mechanism 240 or the key-lock lever 241 by the key-lock lever 241. Since the key-lock lever 241 is located at a position shown in FIG. 18, the pin 241d of the key-lock lever 241 abuts and can press the cam face 243d of the arm 243a of the lock lever 243, thereby preventing the lock lever 243 from rotating counterclockwise. Consequently, the lock lever 243 is stabilized at the position at which the lock portion 243b opposes the positioning pin 231. In this state, the stopper 64 is pulled by the key-lock lever 241 through the key-lock cable 61 and is located at the unlock position, allowing the key rotor 63 to rotate as shown in FIG. 15. Once this state is implemented, since the key rotor 63 is located at the lock position (LOCK) and the key-lock cable 61 is a push-pull cable, the stopper 64 cannot move further upwards, thereby preventing the key-lock lever 241 from rotating.

Figure 19:
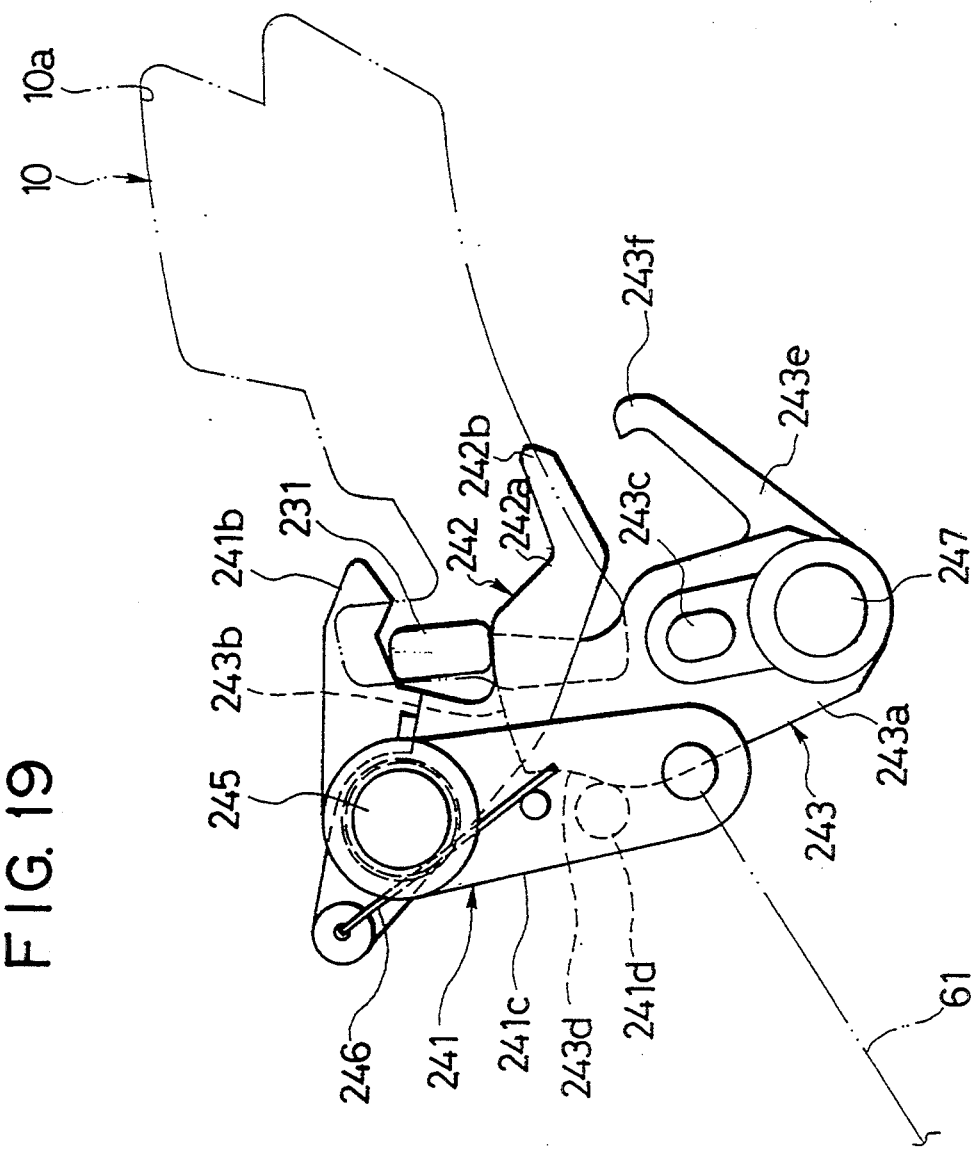
FIG. 19 is an elevational view of the shift lever apparatus, showing the positioning pin unlocked and moving downward.

In this state, even if the user, while pressing the knob button 34, tries to move the positioning pin 231 downwards, the positioning pin 231 is prevented from being moved downwards since the positioning pin 231 abuts the lock portion 243b of the lock lever 243 as shown in FIG. 19. Accordingly, the shift lever 30 can be prevented from being shifted to allow the positioning pin 231 to move from the parking position (P) toward the running positions.

In order to shift the shift lever 30 so that the positioning pin 231 moves from the parking position (P) toward the running positions, the engine key is inserted into the cylinder lock 60 and is rotated so that the key rotor 63 rotates toward the on position (ON). As a result, the restricting portion 63a is withdrawn from a position located along the direction in which the stopper 64 slides, as shown in FIG. 17, thereby allowing the stopper 64 to move upwards. However, the key-lock lever 241, which is being pressed by the positioning pin 231, is stabilized in a position as shown in FIGS. 15 and 18. At this time, the solenoid 44 is turned on (i.e., the plunger 48 enters the solenoid 44), whereby the lock lever 243 is maintained at the position at which the the lock lever 243 locks the positioning pin 231.

In this state, when the brake pedal 92 is pressed after the engine is started, the solenoid 44 is turned off, whereby the plunger 48 exits the solenoid in the direction shown by an arrow A in FIG. 15. As a result, the lock lever 243 is rotated counterclockwise as shown in FIG. 19.

In this off state, when the user presses the knob button 34 to move the positioning pin 231 downwards, the pin 241d is pressed by the cam face 243d of the lock lever 243, whereby the key-lock lever 241 rotates clockwise together with the support lever 242 as shown in FIGS. 19 and 20. Accordingly, the hook portion 242b of the support lever 242 engages the hook portion 243f of the lock lever 243, thereby maintaining the unlock state of the lock mechanism 240 as shown in FIGS. 17 and 21. That is, when the positioning pin 231 is not positioned at the parking position (P), the hook portion 242b and the hook portion 243f serve to prevent the support lever 242 from being adversely rotated while being mutually engaged.

In this state, by further pressing the knob button 34 so that the positioning pin 231 is removed from the parking position (P), the shift lever 30 can be shifted to move the positioning pin 231 from the parking position (P) toward the running positions, thereby allowing the vehicle to run.

The explanation regarding the manner of removing the engine key in the above-described driving state is almost the same, except that the engagement between the hook portion 242b and The hook portion 243f is released when the lock lever 243 rotates clockwise due to the entering of the plunger 48, therefore further explanation is omitted.

In this third embodiment, when the shift lever 30 moves the positioning pin 231 from the running position toward the parking position (P), since the support lever 242 is locked by the hook portion 243f, the support lever 242 does not interfere with the movement of the positioning pin 231 toward the parking position (P), thereby improving the operating characteristics of the shift lever 30.

What is claimed is:

1. A shift lever apparatus provided in a vehicle comprising:
    a positioning plate with a parking position and a running position;
    a shift lever pivotally supported on a vehicle body and provided with a rod, said rod being energized in a first direction by an energizing member;
    a positioning pin arranged on the rod and movable between the parking position and a running position;
    a first lever pivotally supported on the positioning plate by a shaft and provided with an arm, said arm of the first lever being positioned over the positioning pin positioned at the parking position;
    a second lever pivotally supported on the positioning plate by a shaft and provided with an arm, said arm of the second lever being positioned under the positioning pin positioned at the parking position;
    energizing means for energizing the first and second levers so as to draw the arms of the first and second levers close together and to restrain the positioning pin positioned at the parking position;
    an actuator connected to and actuating the lock lever so as to rotate the lock lever in predetermined directions;
    a lock lever pivotally supported by a shaft which is at right angles to the shaft of the second lever and provided with an arm, said arm of the lock lever being engagable with the second lever by being pressed by the first lever so that the second lever can be stabilized under the positioning pin positioned at the parking position to lock the positioning pin at the parking position; and
    a key-interlock mechanism for locking and unlocking the key of the vehicle, said key-interlock mechanism with a cable being connected to the first lever through a key-lock cable.

2. A shift lever apparatus according to claim 1, wherein the first and second levers are supported by the same shaft, the second lever has a projection projecting in the direction in which the shaft of the first and second levers extends, the arm of the lock lever engages the projection of the second lever, the first lever has a bell-crank shape in which the other arm is connected to the key-lock cable, and the lock lever has a bell-crank shape in which the other arm of the lock lever is connected to an end of the actuator.

3. A shift lever apparatus provided in a vehicle comprising:

a positioning plate with a parking position and a running position;

a shift lever pivotally supported on a vehicle body and provided with a rod, said rod being energized in a first direction by an energizing member;

a positioning pin arranged on the rod and movable between the parking position and a running position;

a first lever pivotally supported on the positioning plate by a shaft and provided with an arm, said arm of the first lever being positioned over the positioning pin positioned at the parking position;

a second lever pivotally supported on the positioning plate by a shaft and provided with an arm, said arm of the second lever being positioned under the positioning pin positioned at the parking position;

energizing means for energizing the first and second levers so as to draw the arms of the first and second levers close together and to restrain the positioning pin positioned at the parking position;

an actuator connected to and actuating the lock lever so as to rotate the lock lever in predetermined directions;

a lock lever pivotally supported by a shaft which is parallel to the shaft of the second lever and provided with an arm, said arm of the lock lever being pressed by the first lever when the positioning pin is positioned at the parking position so as to be stabilized under the positioning pin to lock the positioning pin at the parking position; and a key-interlock mechanism for locking and unlocking the key of the vehicle, said key-interlock mechanism with a cable being connected to the first lever through a key-lock cable.

4. A shift lever apparatus according to claim 3, wherein the first and second levers are supported by the same shaft, the lock lever has a bell-crank shape in which the other arm of the lock lever is connected to an end of the actuator, and the first lever has a bell-crank shape in which the other arm is connected to the key-lock cable, and wherein the other arm of the first lever has a projection which abuts a side face of the arm of the lock lever when the positioning pin is positioned at the parking position.

5. A shift lever apparatus according to claim 4, wherein the second and lock levers have second lever lock means for preventing the second lever from being rotated when the positioning pin is moved from the running position toward the parking position.

6. A shift lever apparatus according to claim 5, wherein the second lever lock means includes a hook portion provided at an end of the other arm of the lock lever and a hook portion provided at an end of the second lever so that the hook portions can engage one other.

* * * * *